United States Patent [19]
Oda et al.

[11] Patent Number: 5,175,686
[45] Date of Patent: Dec. 29, 1992

[54] SUSPENSION APPARATUS OF AUTOMOTIVE VEHICLE

[75] Inventors: Kazuya Oda; Yasuma Nishiyama, both of Hiroshima, Japan

[73] Assignee: Mazda Motor Corporation, Hiroshima, Japan

[21] Appl. No.: 624,091

[22] Filed: Dec. 7, 1990

[30] Foreign Application Priority Data

Dec. 7, 1989 [JP] Japan .................................. 1-320263

[51] Int. Cl.⁵ ............................................. B60G 17/00
[52] U.S. Cl. ................................ 364/424.05; 280/707; 280/840
[58] Field of Search .................. 364/424.05; 280/707, 280/840

[56] References Cited

U.S. PATENT DOCUMENTS

| | | | |
|---|---|---|---|
| 4,803,630 | 2/1989 | Takizawa et al. | 280/707 |
| 4,865,347 | 9/1989 | Fukushima et al. | 280/707 |
| 4,869,528 | 9/1989 | Buma et al. | 280/840 |
| 5,015,006 | 5/1991 | Takehara et al. | 280/707 |
| 5,029,328 | 7/1991 | Kamimura et al. | 280/707 |
| 5,056,812 | 10/1991 | Takehara et al. | 280/707 |

Primary Examiner—Gary Chin
Attorney, Agent, or Firm—Fish & Richardson

[57] ABSTRACT

A suspension apparatus of an automotive vehicle having a liquid cylinder disposed between a member on the side of a vehicle body and a member on the side of each wheel and a flow rate control valve so disposed as to implement a supply or discharge of an operating liquid to or from a liquid pressure chamber of the liquid cylinder is so designed as to implement reverse roll control for reversing rolling the vehicle body when the vehicle is running in a predetermined running region. When the behavior of the vehicle is changing frequently, for example, when the vehicle is running along a zig-zag course, namely, when the direction of transverse acceleration acting upon the vehicle body changes frequently, the reverse roll control is inhibited.

13 Claims, 4 Drawing Sheets

SUSPENSION APPARATUS OF AUTOMOTIVE VEHICLE

BACKGROUND OF THE INVENTION

1. Field of the Invention

The present invention relates to a suspension apparatus of an automotive vehicle and, more particularly, to a suspension apparatus of an automotive vehicle, having a liquid cylinder disposed between a member on the vehicle body side and a member of each wheel side and a flow rate control valve so disposed as to alter a suspension characteristic by controlling a supply or discharge of an operating liquid to or from a liquid pressure chamber of the liquid cylinder.

2. Description of Related Art

Heretofore, for example, Japanese Patent Laid-open Publication (kokai) No. 130,418/1988 discloses an active suspension apparatus adapted so as to alter its suspension characteristics by alterring the amount of a liquid disposed in a liquid cylinder by controlling the supply or discharge of an operating liquid to or from the liquid cylinder mounted between a member on the vehicle body side and a member on each wheel side in accordance with the running state of the vehicle. This active suspension apparatus has a flow rate control valve for controlling the supply and discharge of the operating liquid to and from a liquid pressure chamber of the liquid cylinder, an acceleration detecting means for detecting acceleration in the vertical direction, or vertical acceleration, of the vehicle body, an integration means for integrating a signal detected by the acceleration detecting means, and a control means for determining a control amount of the flow rate control valve by multiplying the output signal generated by the integration means with a predetermined gain coefficient. This active suspension apparatus is arranged such that, for instance, when it is confirmed by signals detected by the acceleration detecting means that the vehicle body is rolling, the control signal corresponding to the control amount determined by the control means is generated to the flow rate control valve, thereby subjecting the amount of the operating liquid to be supplied or discharged to or from the liquid cylinder to a PID control and consequently controlling the rolling of the vehicle body.

It is to be noted herein that this active suspension apparatus is so arranged as to improve running stability by executing a reverse roll control by generating a control signal from the control means to the flow rate control valve so as to make the automotive vehicle in a reversely rolling state, when the automotive vehicle lies in a low acceleration region or in a low-speed running state.

The automotive vehicle with the active suspension apparatus having the function of controlling the reverse rolling can provide good driving feeling during ordinary cornering or during one cornering, because the driver can readily confirm the situation of a cornering site or position in a visual way and the driver can stabilize its posture. It has been found, however, that the driving feeling can be rather impaired and the driver may be confused in thinking as if the vehicle is normally rolling and the function of the active suspension would have been damaged, because the posture of the driver changes whenever the vehicle frequently corners in alternating directions during driving along a zig-zag course or the like when the steering wheel is to be frequently steered.

When the automotive vehicle is frequently rolling alternatively in normal and reverse ways, the driver may be confused in thinking as if the vehicle is cornering in a normal fashion without any rolling control and it cannot come to the feeling that the vehicle is rolling actually in a reverse way. Further, the automotive vehicle with the active suspension function may give the driver the impression as if no rolling would happen so much even if the rolling is actually occurring in the reverse way opposite to usual automotive vehicles. Hence, if the driver may come to the wrong recognition that the active suspension function would have been damaged if the vehicle would be rolled in a continuous manner.

It is further to be noted that, in the reverse roll control state, the control should be carried out so as to make the vehicle height on the exterior side of the cornering wheels, upon which a larger load is imposed, higher than the interior side of the cornering wheels, so that a larger driving force is required, as compared with the normal roll control state. Thus, when the reverse roll control is attempted to be carried out in a state in which the steering wheel is steered frequently as in the manner as described hereinabove, more power is consumed for driving the suspension apparatus.

SUMMARY OF THE INVENTION

The present invention has been performed in order to solve the problems and drawbacks conventional suspension apparatuses present and it has the object to provide a suspension apparatus of an automotive vehicle having the function of controlling the rolling in a reverse way, which is so designed as to prevent a driving feeling from being impaired or worsened by controlling the posture of the driver so as not to be changed so frequently and as to reduce the amount of power to be consumed for driving the suspension apparatus, when the steering wheel is repeatedly and frequently steered.

In order to achieve the aforesaid object, the present invention has the object to provide a suspension apparatus of an automotive vehicle having a liquid cylinder disposed between a member on the side of a vehicle body and a member on the side of each wheel and a flow rate control valve so disposed as to implement a supply or discharge of an operating liquid to or from a liquid pressure chamber of the liquid cylinder, comprising:

a control means for generating a control signal to the flow rate control valve so as to make the vehicle body in a reversely rolling state in a predetermined running region;

a vehicle-behavior detecting means for detecting a behaviour of the automotive vehicle; and a determination means for determining the behaviour of the automotive vehicle in accordance with a signal detected by and generated by said vehicle-behavior detecting means and for suspending control by the control means so implemented as to make the vehicle body roll in a reverse way when the behaviour of the automotive vehicle has been determined by said determining means as changing frequently.

In accordance with the present invention, when the automotive vehicle has been determined by the determination means for determining the behaviour of the automotive vehicle in accordance with a signal detected by and generated by said vehicle-behavior detecting means as the behaviour of the automotive vehicle has been changed frequently, the control by the control means so implemented as to make the vehicle body roll in a reverse way is suspended, thereby preventing a driving feeling from being impaired or worsened due to changes in the posture of the driver and suppressing consumption of power.

And when it is confirmed by the determination means that the behavior of the automotive vehicle has been turned out stable from the state in which the automotive vehicle had changed its behavior frequently, it is preferred that, in a predetermined transition period of time, the automotive vehicle is gradually brought into a state where it is rolled in a reverse way from the state in which the reverse roll control is suspended.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
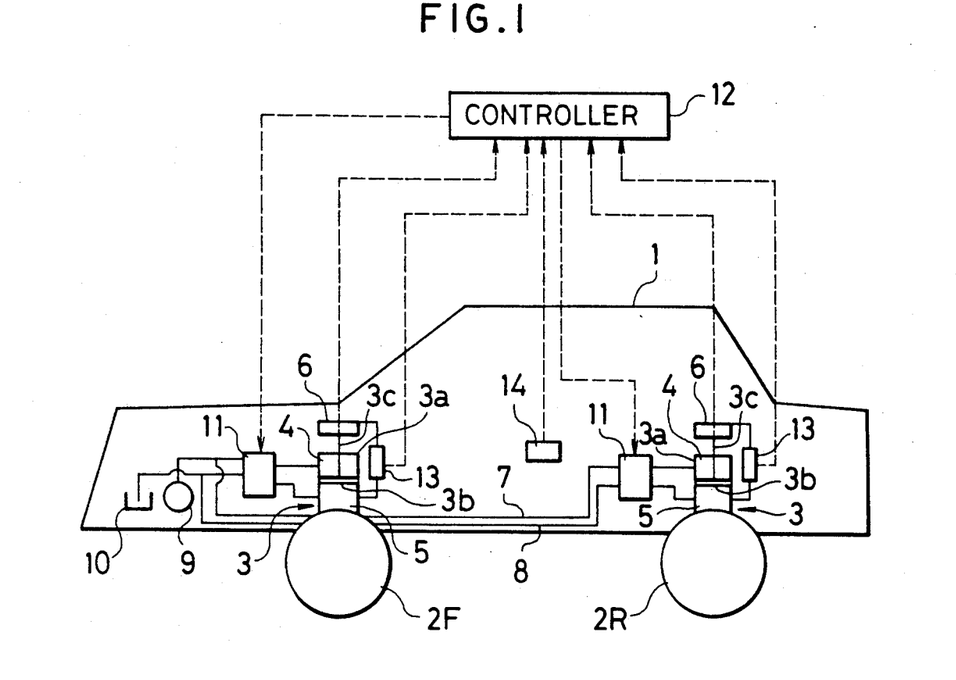
FIG. 1 is a schematically diagrammatic representation of an outline of the construction of the suspension apparatus of an automotive vehicle according to the present invention.

FIG. 1 shows an outline of the construction of a suspension apparatus of the automotive vehicle according to the present invention. As shown in FIG. 1, there is provided a liquid cylinder 3 between a vehicle body 1 and each of front wheels 2F and between the vehicle body 1 and each of rear wheels 2R. The liquid cylinder 3 comprises a cylinder body 3a connected at its lower end portion to a member on the wheel side and a piston 3b so inserted into the cylinder body 3a as to form and define two liquid pressure chambers, namely, an upper liquid pressure chamber 4 and a lower liquid pressure chamber 5 within the cylinder body 3a. On an upper face of the piston 3b is so provided a piston rod 3c as to be extended or contracted, thereby changing a cylinder stroke. The upper end face of the piston rod 3c is connected to the vehicle body 1 through a load sensor for sensing a load acting upon the suspension.

The upper and lower liquid pressure chambers 4 and 5 of the liquid cylinder 3 are communicated with a hydraulic pump 9 and a reserve tank 10 through oil passages 7 and 8, respectively. On the oil passages 7 and 8 is mounted a flow rate control valve 11 for controlling a supply or discharge of an operating liquid to or from the liquid pressure chambers 4 and 5 of each liquid cylinder 3, an electromagnetically proportional control valve that can assume three shift positions including a suspension position for suspending the supply of the operating liquid to the liquid pressure chambers 4 and 5, a stroke decreasing position for supplying the operating liquid to the upper liquid pressure chamber 4 and at the same time discharging the operating liquid from the lower liquid pressure chamber 5, and a stroke increasing position for supplying the operating liquid to the lower liquid pressure chamber 5 and simultaneously discharging it from the upper liquid pressure chamber 4. The flow rate control valve 11 is further so constructed as to control the supply and discharge of the operating liquid to and from the upper and lower liquid pressure chambers 4 and 5 through its shift operation in accordance with the control signal generated from a controller 12.

Figure 2:
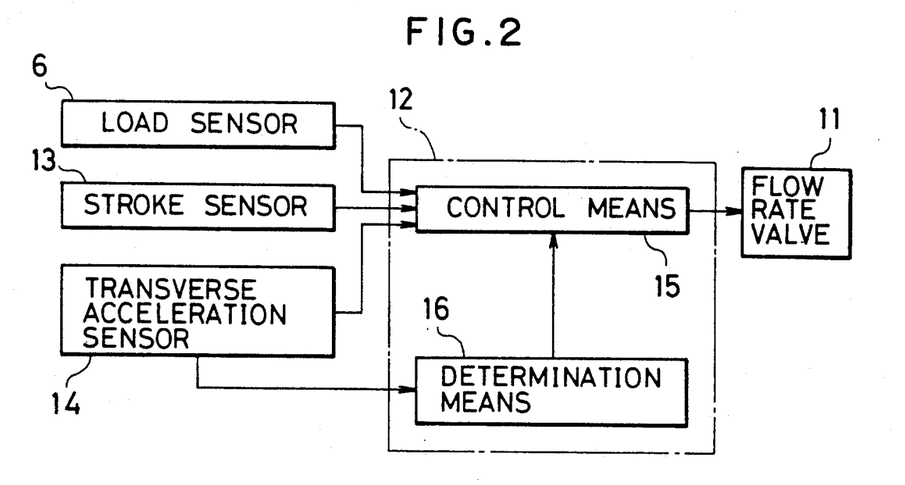
FIG. 2 is a block diagram showing the interior construction of a controller.

As shown in FIG. 2, the controller 12 comprises a control means 15 that allows signals to be inputted from the load sensor 6, a stroke sensor 13 for sensing an extended or contracted stroke of the piston rod 3a for each liquid cylinder 3, and a transverse acceleration sensor 14 for sensing transverse acceleration, or acceleration in the transverse direction, acting upon the vehicle body. The control means 15 of the controller 12 then computes a target stroke Xr of the piston rod 3a for each wheel on the basis of the following formula, in accordance with an initial load Fo detected at the time of a stop of the automotive vehicle by the load sensor 6, a running load F detected thereby during running, an initial stroke Xo detected at the time of a stop of the automotive vehicle by the stroke sensor 13, transverse acceleration G detected by the transverse acceleration sensor 14, a predetermined spring coefficient K, and a predetermined roll control coefficient Kg.

$$Xr = Xo + \frac{Fo - F}{K} + Kg \times G$$

Then, the control means 15 generates the control signal corresponding to the target stroke Xr, computed as described hereinabove, to the flow rate control valve 11.

The aforesaid formula means that the target stroke Xr to be employed for a variable control of the suspension characteristics is determined by adding a stroke component for controlling vibration of the vehicle body resulting from a movement of the load in the vertical direction and a stroke component for controlling the rolling movement of the vehicle body resulting from the transverse acceleration G acted during cornering to the initial stroke Xo. The stroke component for controlling vibration of the vehicle body resulting from the vertical movement of the load is determined by dividing the difference between the initial load Fo and the running load F with the spring coefficient K and the stroke component for controlling the rolling movement of the vehicle body resulting from the transverse acceleration G is determined by multiplying the transverse acceleration G with the roll control coefficient Kg.

It is noted herein that the roll control coefficient Kg is a value so set as to correspond to the acceleration prior to or subsequent to acting upon the vehicle body or a vehicle speed and it comprises a first roll control coefficient Kg1 and a second roll control coefficient Kg2, the first roll control coefficient Kg1 being to execute the reverse roll control and the second roll control coefficient Kg2 being to suspend the reverse roll control and to control the vehicle body to a zero roll state, when the vehicle body is positioned in a predetermined low acceleration region, e.g., 0.3 G or lower, or in a predetermined low-speed running region, e.g., 60 km/hour or slower.

As shown in FIG. 2, the controller further comprises a determination means 16 which is so constructed as to determine whether the behavior of the vehicle is changing frequently, in accordance with a signal detected by the vehicle-behavior detecting means comprising the transverse acceleration sensor 14 and as to select either of the first roll control coefficient Kg1 or the second roll control coefficient Kg2. In other words, the transverse roll control is executed on the basis of the first roll control coefficient Kg1 when it is confirmed that the behavior of the vehicle body is stable without frequently steering the steering wheel, while a so-called zero roll control is executed on the basis of the second roll control coefficient Kg2 when it is confirmed that the behavior of the vehicle body is frequently changing while the steering wheel is steered repeatedly in alternating directions.

Figure 3:
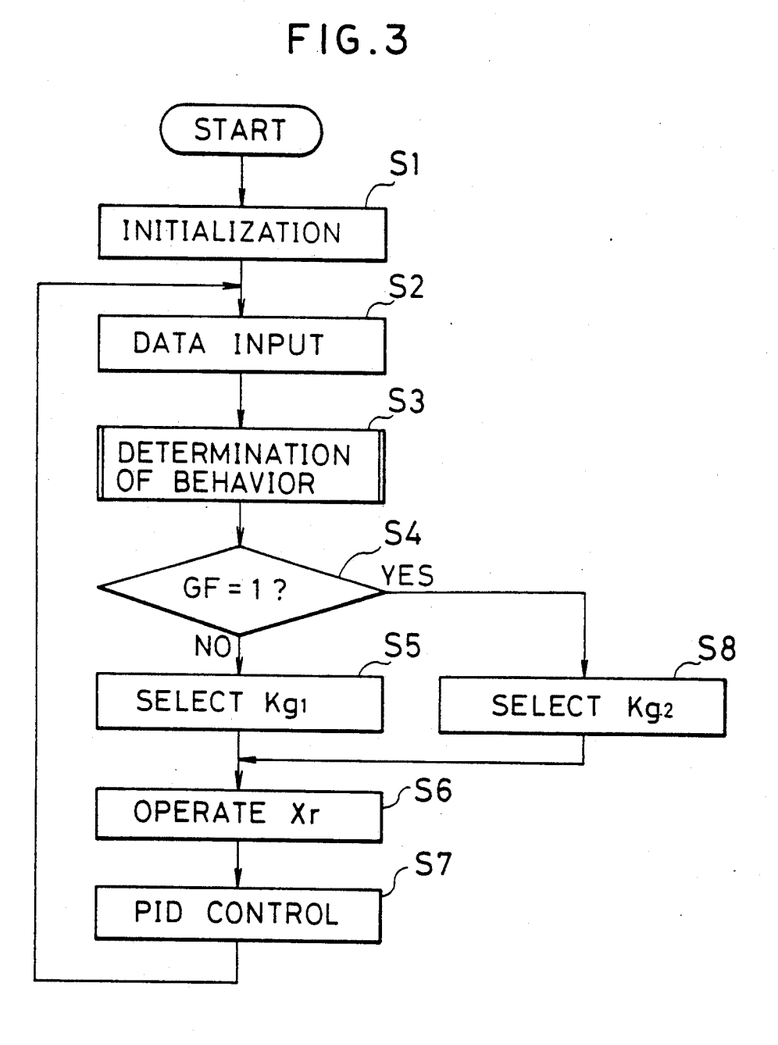
FIG. 3 is a flowchart showing the operation of control over the rolling of the automotive vehicle.

Description will be made of the control operation of the suspension apparatus according to the present invention on the basis of the flowchart as shown in FIG. 3.

After the start of the control operation, the system is initialized at step S1 and the program flow goes to step S2 at which there are inputted data computed on the basis of signals detected by the load sensor 6, the stroke sensor 13 and the transverse acceleration sensor 14. Then, at step S3, the behavior of the vehicle body is determined in accordance with a vehicle-behavior determination routine as shown specifically in FIG. 4. After the determination of the behavior of the vehicle body at step S3, the program flow goes to step S4 at which a decision is made to determine if a flag GF so designed as to be indicated in accordance with the result of determination at step S3 is set to one (1), namely, if the behavior of the vehicle body is frequently changing. When the result of decision at step S4 indicates that the flag GF is not set to one, i.e. when it is confirmed that the vehicle is running in such a manner as being stable in behavior, then the program flow advances to step S5 at which the first roll control coefficient Kg1 for the reverse roll control is selected, followed by proceeding to step S6 at which the target stroke Xr is operated on the basis of the aforesaid formula. Then, at step S7, the control signal corresponding to the resulting target stroke Xr is generated to the flow rate control valve 11, thereby executing a PID control at step S7.

On the other hand, when it is determined at step S4 that the flag GF is set to one, namely, when it is confirmed that the behavior of the vehicle body is frequently changing, the program flow goes to step S8 at which the second roll control coefficient Kg2 is selected for the so-called zero roll control, followed by proceeding to step S6 and suspending the reverse roll control, thereby transferring the control state to the so-called zero control state.

Figure 4:
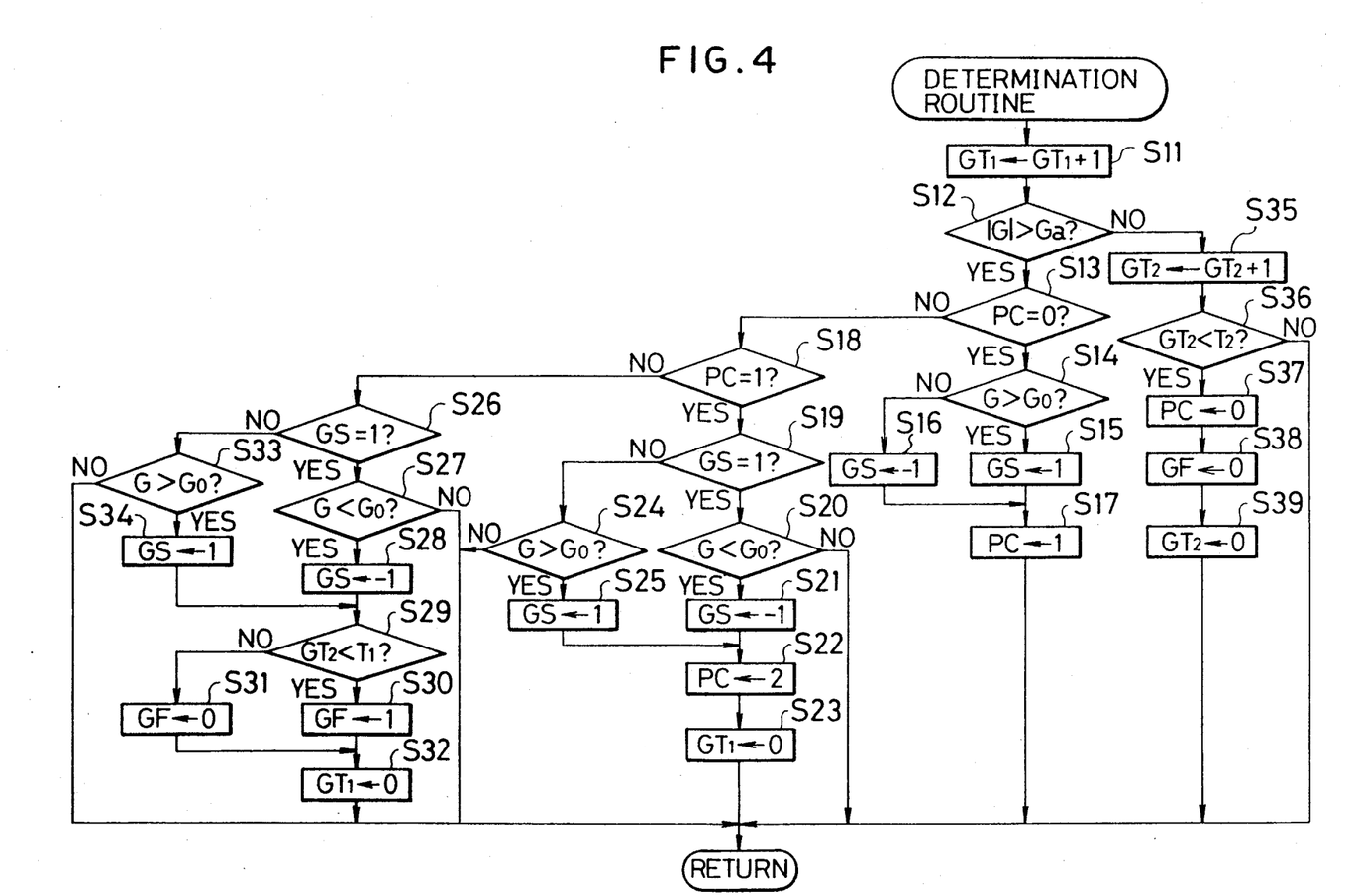
FIG. 4 is a flowchart showing a determination routine for determining the behaviour of the automotive vehicle.

Description will now be made of the vehicle-behavior determination routine with reference to the flowchart as shown in FIG. 4.

First, at step S11, a count value GT1 of a first timer for counting a time required for the vehicle-behavior determination is incremented by one, followed by proceeding to step S12 at which a decision is made if the absolute value of the transverse acceleration computed on the basis of the signal detected by the transverse acceleration sensor 14, e.g. |G|, is greater than a predetermined reference acceleration Ga. When the result of decision at step S12 indicates that the absolute value of transverse acceleration |G| is found greater than the predetermined reference acceleration Ga, namely, when it is confirmed that a predetermined transverse acceleration is acting upon the vehicle body due to the vehicle being cornering, the program flow goes to step 13 at which it is decided to determine if a flag PC indicative of the number of determinations is set to zero (0), namely, if the vehicle is cornering for the first time during the control operation.

When it is decided at step S13 that the flag PC is set to zero, namely, when it is confirmed that the number of determinations indicated by the flag PC is zero, the program flow proceeds to step S14 at which it is then determined if it is currently cornering to the left or to the right by comparing the transverse acceleration G with a predetermined reference acceleration value Go set so as to determine the direction of cornering. When the result of decision at step S14, on the one hand, indicates that the transverse acceleration G is greater than the reference acceleration Go, namely, for example, that the vehicle body is cornering to the right, the program flow goes to step S15 at which a flag GS indicative of the direction of the rolling of the vehicle body is set to one (1), thereby displaying the fact that the vehicle is cornering to the right. When the result of decision at step S14, on the other hand, indicates that the transverse acceleration G is equal to or smaller than the reference acceleration Go, namely, for example, that the vehicle body is cornering to the left, then the program flow goes to step S16 at which the flag GS is set to minus one (−1), thereby displaying the vehicle being cornering to the left. Then, after steps S15 and S16, the program flow goes to step S17 at which the flag PC is set to one, thereby displaying that the first determination has been conducted, followed by the return of the program flow.

When the result of decision at step S13 indicates that the flag PC indicative of the number of determinations is not set to zero, then the program flow goes to step S18 at which a decision is made to determine whether or not the flag PC is set to one (1), namely, whether or not the control operation is to be carried out after the first determination has been implemented. In case where it is decided at step S18 that the flag PC is set to one, namely, when it is confirmed that the control operation is to be carried out after the first determination, then the program flow goes to step S19 at which it is further decided to determine if the flag GS indicative of the cornering direction is set to one, i.e. if it is displayed that the vehicle is cornering toward the right direction. When the result of decision at step S19 indicates that the flag GS is set to one, namely, when it is confirmed that the display is made indicating the vehicle being cornering to the right, on the one hand, then the program flow goes to step S20 at which it is decided to determine if the transverse acceleration G is smaller than the reference acceleration value Go, i.e. if the vehicle is cornering to the left. If the result of decision at step S20 indicates that the transverse acceleration G is smaller than the reference acceleration value Go and it is confirmed that the vehicle has changed its turning direction from the right direction to the left direction, then the program step goes to step S21 at which the flag GS indicative of the rolling direction is set to minus one (−1), followed by going to step S22 at which the flag PC indicative of the number of determinations is set to two (2). Then, at step S23, the count value GT1 of the first timer is reset to zero (0), followed by the return of the program flow.

When it is decided at step S19 that the flag GS indicative of the rolling direction of the automotive vehicle is not set to one, namely, that the flag GS is set to minus one and it is confirmed that the display is made to the effect that the automotive vehicle is cornering to the left, then the program flow goes to step S24 at which a decision is made to determine if the transverse acceleration G is larger than the reference determination value Go, namely, if the vehicle has changed its turning direction to the right. At this determination, when it is confirmed that the vehicle has changed its cornering direction from the left direction to the right direction, i.e., when the result of decision at step S24 indicates that the transverse acceleration G is larger than the reference value Go, then the program flow goes to step S25 at which the flag GS indicative of the rolling direction of the vehicle is set to one, followed by proceeding to step S22 and repeating the program flows as have been described hereinabove.

Referring back to step S18, when the result of decision at step S18 indicates that the flag PC indicative of the number of determinations is not set to one and it is confirmed that the flag PC is set to two (in this embodiment, the number of the flag PC being in the range from zero to two), then the program flow goes to steps S26 at which it is decided to determine if the flag GS is set to one. When the result of decision at step S26 indicates that the flag GS is set to one, on the one hand, then at a series of steps S27 and S28, a decision is further made to determine whether or not the automotive vehicle has changed its turning directions in the same manner as in step S20 and S21, respectively. In other words, when it is confirmed at step S26 that the vehicle has changed its cornering from the right direction to the left direction, then the flag GS is set to minus one at step S28 and the program flow goes to step S29. If it is decided at step S26 that the flag GS is not set to one, on the other hand, the program flow goes to step S33 at which the decision is made in the same manner as at step S24, followed by proceeding to step S34 at which the process is made in the same manner as at step S25. In other words, when it is confirmed at step S33 that the vehicle has cornered from the left to the right, then the flag GS is set to one at step S34 and the program flow goes to step S29. After steps S28 and S34, a decision is made at step S29 to determine if the count value GT1 of the first timer is smaller than a predetermined reference time T1. As a result of decision at step S29, when it is confirmed that the count value GT1 is smaller than the reference time T1, namely, that the behavior of the automotive vehicle has been changed within the predetermined time, then the program flow goes to step S30 at which a flag GF indicative of the behavior of the vehicle is set to one, thereby displaying that the vehicle has been frequently changing its behavior, followed by proceeding to step S32 at which the count value GT1 of the first time is reset to zero and then returning of the program flow.

On the other hand, when it is confirmed as a result of determination at step S29 that the count value GT1 is larger than the reference time T1 and that the predetermined time has been required for changing the cornering direction, then the program flow goes to step S31 at which the flag GF is set to zero, thereby displaying that the behavior of the vehicle is stable and proceeding to step S32 at which the same process has been implemented as described hereinabove.

If it has been decided at step S24 or step S33 at which the transverse acceleration G is larger than the reference value Go or at step S20 or S27 at which the transverse acceleration G is smaller than the reference value Go, then the program flow is returned.

Referring back to step S12, when it is decided that the absolute value of the transverse acceleration $|G|$ is equal to or smaller than the reference acceleration Ga, then the program flow goes to step S35 at which a count value GT2 of a second timer is set by incrementing the count value GT2 by one, in order to confirm that the automotive vehicle has been returned to its stable state. Then, at step S36, a decision is made to determine if the count value GT2 of the second timer is greater than a predetermined time T2. At the decision at step S36, when it is confirmed that the time of the second timer has been counted up, then the program flow goes to step S37 at which the flag indicative of the number of determinations is set to zero, followed by proceeding to step S38 at which the flag GF indicative of the stable behavior of the vehicle is set to zero. Then the program flow proceeds to step S39 at which the count value GT2 of the second timer is reset to zero, followed by the return of the program flow. On the other hand, if the result of decision at step S36 indicates that the the count value GT2 of the second timer is not larger than the reference time T2, then the program flow is returned.

It has been found from the foregoing that, as the suspension apparatus according to the present invention is so constructed as to select the roll control coefficient Kg which determines the roll control state of the automotive vehicle in accordance with the result of determination as to the frequent changes in the behavior of the vehicle, which is made by the determination means 16 in response to the signal from the vehicle-behavior detecting means consisting of the transverse acceleration sensor 14, stability in running of the automotive vehicle can be maintained while retaining a good driving feeling. More particularly, when it is confirmed that the behavior of the automotive vehicle is stable without frequently steering, on the one hand, the reverse roll control is executed by selecting the first roll control coefficient Kg1, thereby turning the vehicle body in a stable state. When it is confirmed that the behavior of the vehicle body is changing frequently as in driving along a zig-zag course, on the other hand, the second roll control coefficient Kg2 is selected to thereby execute the so-called zero roll control, so that the posture of the driver does not change as in the reverse roll control state. Hence, drivability is prevented from worsening and kept in a favorable state.

Figure 5:
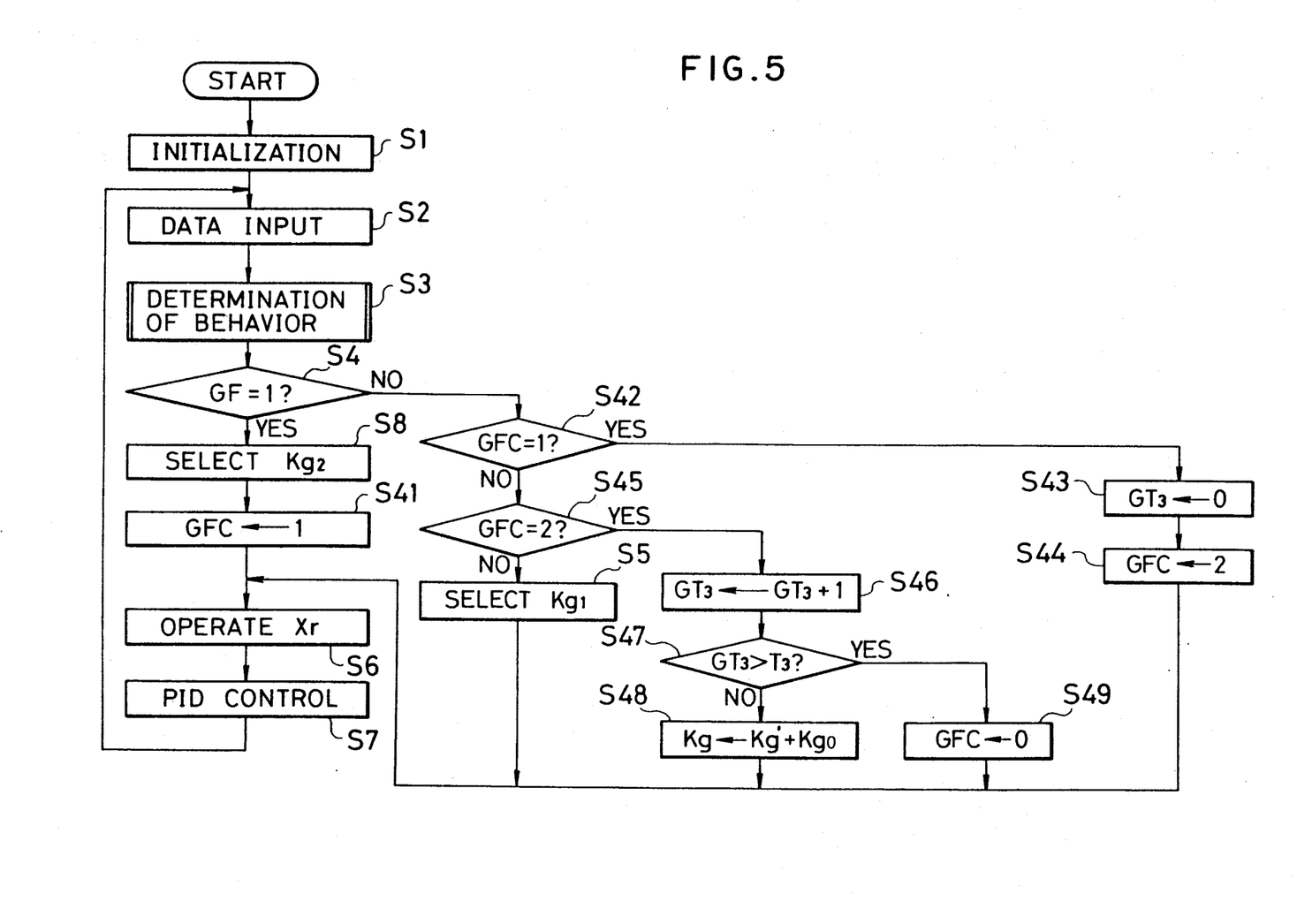
FIG. 5 is a flowchart showing another embodiment of the operation for controlling the rolling of the automotive vehicle.

It is to be noted that, in the embodiment as described hereinabove, the roll control coefficient is to be changed from the first coefficient Kg1 to the second coefficient Kg2 and the zero roll state of the vehicle body is so designed as to be changed immediately to the reverse roll control state at the time when it is determined that the flag GF indicative of the behavior of the vehicle is set to zero at step S4 in the flowchart of FIG. 3 and it is confirmed that the behavior of the automotive vehicle has shifted from its frequently changing state to its stable state. However, as shown in FIG. 5, the roll control state of the vehicle may be changed gradually by providing a transition period for alterring the roll control coefficient. This alternative feature will be described hereinafter with reference to FIG. 5 in which the same processes are provided with the same step numbers as in FIG. 3 and duplicate description will be omitted as long as it is not rendered as essential for the description which follows.

At step S4, when it is determined that the flag GF indicative of the behavior of the automotive vehicle is set to one and it is confirmed that the behavior of the vehicle has been frequently changed, then the second roll control coefficient Kg2 has been chosen at step S8 and a flag GFC indicative of the point of time at which the behavior of the automotive vehicle has been changed and indicative of the transition period is set to one at step S41, thereby displaying that the zero roll control currently in execution, followed by proceeding to step S6 at which the same process is implemented as in FIG. 4. When it is determined at step S4 that the flag GF is set to one and it is confirmed that the behavior of the vehicle is rendered stable, then the program flow goes to step S42 at which a decision is made to determine if the flag GFC is set to one, namely, if the behavior of the vehicle has been shifted immediately before. At step S42, it is decided that the flag GFC is set to one and it is decided that it is immediately after the behavior of the vehicle has been shifted from its frequently changing state to its stable state, then the program flow goes to step S43 at which a count value GT3 of a third timer for determining the elapse of the transition for altering the roll control coefficient Kg is reset to zero, followed by proceeding to step S44 at which the flag GFC is set to two, thereby displaying "During Transition" and then proceeding to step S6.

Once the flag GFC is set to two at step S43, the decision is made to the effect that it is decided, too, that the flag GFC is set to two at step S45 which in turn is implemented after step 42 at which it is decided that the flag GFC is set to one. In this case, the program flow proceeds to step S46 at which the count value GT3 of the third timer is incremented by one, followed by proceeding to step S47 at which a decision is made to determine if the count value GT3 is compared with a predetermined reference time period T3 and if the time of the third timer is counted up, namely, if the count value GT3 is greater than the predetermined reference time T3. At this decision, it is confirmed that the third timer is not counted up and the control operation is still in the process during the transition period of time, then the program flow goes to step S48 at which the current control coefficient Kg is given by adding a predetermined correction value Kgo to the immediately previous roll control coefficient Kg'. Then, at step S6, the target stroke Xr is operated on the basis of this coefficient Kg, thereby executing the control during the transition period of time.

When it is confirmed at step S47 that the third timer has been counted up, the program flow goes to step S49 at which the flag GFC is set to zero, thereby displaying the finish of the transition period and proceeding to step S6. As a result, in order to make the decision at steps S42 and S45 at the time of the coming control operation determining zero, the program flow proceeds to step S5 at which the first roll control coefficient Kg1 is selected.

As described hereinabove, in instances where the vehicle is so constructed as to be changed gradually from its zero roll state to its reverse roll state by providing the transition period of time for alterring the roll control coefficient Kg when it is confirmed that the behavior of the vehicle body has been transferred from its frequently changing state to its stable state, the favorably good driving feeling can be maintained by suppressing the rapid changes in its posture at the time when the roll control is returned to the reverse roll control, and at the same time an appropriate control can be executed without applying any rapid driving force to the suspension apparatus.

It is further to be noted that, when it is confirmed by the determination means 16 that the behavior of the automotive vehicle is changing frequently, the vehicle may be so constructed as to be controlled by the normal roll control corresponding to the state in which the load acts upon the vehicle, in place of the construction so made to correspond to the so-called zero roll control state along the road surface.

It is to be understood that the foregoing text and drawings relate to embodiments of the invention given by way of examples but not limitation. Various other embodiments and variants are possible within the spirit and scope of the invention.

What is claimed is:

1. A suspension apparatus of an automotive vehicle having a liquid cylinder disposed between a member on a side of a vehicle body and a member on a side of each wheel and a flow rate control valve so disposed as to implement a supply or discharge of an operating liquid to or from a liquid pressure chamber of the liquid cylinder, comprising:

a control means for generating a control signal to the flow rate control valve so as to make the vehicle body in a reversely rolling state in a predetermined running region;

a vehicle-behavior detecting means for detecting automotive vehicle body movement; and a determination means for determining the movement of the automotive vehicle in accordance with a signal detected by and generated by said vehicle behavior detecting means, wherein the determination means suspends control by the control means to reverse roll control the movement of the vehicle body by making the vehicle body roll in a reverse way when the movement of the automotive vehicle has been determined by said determining means as changing frequently.

2. A suspension apparatus as claimed in claim 1, wherein said control means allows a transition period of time to be so set as to gradually transfer a suspension state in which said reverse roll control is suspended to a regularly reverse state by releasing the suspension state when said determination means confirms that the movement of the vehicle body changes from a frequently changing state to a stable state in response to said signal from said vehicle-behavior detecting means.

3. A suspension apparatus as claimed in claim 1, wherein said predetermined running region is set as a low-speed region in which a vehicle speed is equal to or slower than a predetermined vehicle speed.

4. A suspension apparatus as claimed in claim 1, wherein said predetermined running region is set as a low-transverse acceleration region in which a transverse acceleration acting upon the vehicle body is equal to or slower than a predetermined transverse acceleration.

5. A suspension apparatus as claimed in claim 1, wherein the control signal generated by said control means is so set to allow a target stroke Xr of said liquid cylinder to become a value obtainable by the following formula:

$$Xr = Xo + \frac{Fo - F}{K} + Kg \times G$$

where
- Xo is a stroke of the liquid cylinder at the time when the vehicle stops;
- Fo is a load acting upon the liquid cylinder at the time when the vehicle stops;
- F is a load acting upon the liquid cylinder during running;
- K is a spring coefficient;
- Kg is a roll control coefficient; and
- G is a transverse acceleration acting upon the vehicle body.

6. A suspension apparatus as claimed in claim 1, wherein said vehicle-behavior detecting means comprises a transverse acceleration detecting means to detect transverse acceleration acting upon the vehicle body.

7. A suspension apparatus as claimed in claim 6, wherein the transverse acceleration is equal to or greater than a predetermined value, which is detected by said transverse acceleration detecting means, and is to be used for determining the movement of the vehicle body.

8. A suspension apparatus as claimed in claim 7, wherein said determination means determines the movement of the vehicle as changing frequently when a direction of the transverse acceleration acting upon the vehicle body has changed during a predetermined period of time.

9. A suspension apparatus as claimed in claim 2, wherein said transition period of time is a predetermined period of time to be set by a timer.

10. A suspension apparatus as claimed in claim 9, wherein roll control is gradually returned to a regularly reverse roll control by gradually increasing a control coefficient for the reverse roll control in the transition period of time.

11. A suspension apparatus as claimed in claim 10, wherein a current reverse-roll control coefficient is set in the transition period of time by adding a predetermined value to a previous reverse-roll control coefficient.

12. A suspension apparatus as claimed in claim 1, wherein said control means generates a control signal to the flow rate control valve so as to cause the vehicle body not to roll by executing a zero roll control, when the reverse roll control is suspended.

13. A suspension apparatus as claimed in claim 1, wherein the determination means comprises means for executing transverse roll control based on a first roll control coefficient Kg1 when the vehicle body is stable and for executing zero roll control based on a second roll control coefficient Kg2 when the vehicle body is frequently changing directions.

* * * * *